United States Patent Office 3,128,292
Patented Apr. 7, 1964

---

3,128,292
OPTIONALLY 17-(HYDROCARBON-SUBSTITUTED) 17-OXYGENATED-3α-ALKOXY-5α-ANDROSTANES
Raymond E. Counsell, Skokie, and Paul D. Klimstra, Northbrook, Ill., assignors to G. D. Searle & Co., Chicago, Ill., a corporation of Delaware
No Drawing. Filed June 18, 1962, Ser. No. 203,016
8 Claims. (Cl. 260—397.4)

The present invention is concerned with novel 17-oxygenated-3-alkyl ethers of the androstane series and, more particularly, with compounds of the structural formula

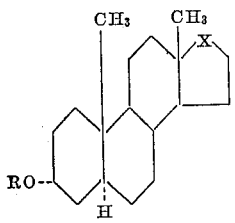

wherein X is a carbonyl, β-hydroxymethylene, α-(lower alkyl)-β-hydroxymethylene, α-(lower alkynyl)-β-hydroxymethylene, β-(lower alkanoyl)oxymethylene, α-(lower alkyl)-β-(lower alkanoyl)oxymethylene, or α-(lower alkynyl)-β-(lower alkanoyl)oxymethylene radical, and R is a lower alkyl radical.

Representative of the aforementioned lower alkyl radicals are, typically, methyl, ethyl, propyl, butyl, pentyl, hexyl, and the branched-chain isomers thereof. Examples of lower alkynyl radicals are ethynyl, propynyl, butynyl, pentynyl, hexynyl, and the branched-chain groups isomeric therewith. The lower alkanoyl groups comprehended in the X term are illustrated by formyl, acetyl, propionyl, butyryl, valeryl, caproyl, and the corresponding branched-chain isomers.

A starting material suitable for use in the manufacture of the compounds of this invention is 3β-p-tolylsulfonyloxy-5α-androstan-17-one. This material is heated with a lower alkanol to afford the corresponding 3α-(lower alkoxy) compound. Reaction of these 3α-(lower alkoxy)-17-ones with a reducing agent such as sodium borohydride results in reduction of the 17-keto group, thus providing the instant 17β-ols. On the other hand, the aforementioned 3α-(lower alkoxy)-17-ones can be converted to the corresponding 17α-(lower alkyl)-17β-ols by reaction with an appropriate organometallic reagent such as an alkyl magnesium halide or a lithium alkyl. Furthermore, reaction of those 17-ones with a lower alkyne in the presence of an alkaline catalyst or, alternatively, with an alkali metal alkynylide, for example a sodium or potassium alkynylide, or with an alkynyl magnesium halide results in the 17α-alkynyl-17β-ols of the present invention. Catalytic reduction of the latter substances affords the instant 17α-(lower alkyl)-17β-ols in which the lower alkyl moiety contains more than one carbon atom.

These processes are specifically illustrated by the following typical examples. The reaction of the starting material, 3β-p-tolylsulfonyloxy-5α-androstan-17-one, with methanol at the reflux temperature produces 3α-methoxy-5α-androstan-17-one, which substance is contacted with sodium borohydride and aqueous isopropyl alcohol at room temperature to afford 3α-methoxy-5α-androstan-17β-ol. When 3α-methoxy-5α-androstan-17-one, on the other hand, is allowed to react with methyl magnesium bromide and the resulting adduct is hydrolyzed with aqueous ammonium chloride, 3-methoxy-17α-methyl-5α-androstan-17β-ol is obtained. The instant 17α-ethynyl 3α-methoxy-5α-androstan-17β-ol is obtained by allowing the aforementioned 3α-methoxy-5α-androstan-17-one to react with acetylene in the presence of potassium hydroxide as a catalyst. Reduction of that 17α-ethynyl compound by hydrogenation in the presence of 5% palladium-on-carbon catalyst results in 17α-ethyl-3α-methoxy-5α-androstan-17β-ol.

The lower alkanoate esters of the present invention can be obtained by acylation of the corresponding 17β-ols. A specific process suitable for this purpose is illustrated by the reaction of 3α-methoxy-17α-methyl-5α-androstan-17β-ol with acetic anhydride and pyridine at the reflux temperature to produce the corresponding 17-acetate. In the case of the instant 17β-ols lacking a 17-hydrocarbon substituent the acylation can be conveniently conducted at room temperature.

The compounds of this invention display valuable pharmacological properties. They are, for example, potent hypocholesterolemic agents which possess the particular advantages of lacking potent androgenic and anti-estrogenic side effects.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

*Example 1*

A mixture of 44.5 parts of 3β-p-tolylsulfonyloxy-5α-androstan-17-one and 400 parts of methanol is heated until the solid dissolves, at which time the resulting solution is heated at reflux for about 72 hours. Distillation of the solvent at reduced pressure affords a residue, which is extracted with ether. This ether solution is washed successively with water, dilute aqueous sodium carbonate, and water, dried over anhydrous potassium carbonate containing decolorizing carbon, then stripped of solvent at reduced pressure. The resulting residue is recrystallized from hexane to afford needle-like crystals of 3α-methoxy-5α-androstan-17-one, which melts at about 124.5–126.5° and is further characterized by an optical rotation of +82° in chloroform. This substance is represented by the structural formula

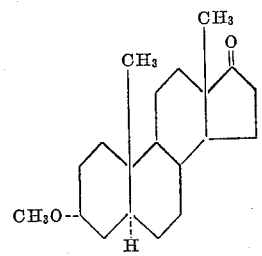

EXAMPLE 2

To a solution of one part of 3α-methoxy-5α-androstan-17-one and 20 parts of isopropyl alcohol is added a solution of 0.8 part of sodium borohydride in 8 parts of isopropyl alcohol containing 1.5 parts of water, and the resulting reaction mixture is stirred at room temperature for about 2½ hours, then is poured slowly into a mixture of ice and water. The resulting precipitate is collected by filtration, washed on the filter with water, then dried in air. Recrystallization from aqueous methanol affords 3α-methoxy-5α-androstan-17β-ol, M.P. about 146.5–148.5°; $[\alpha]_D = +7°$ (chloroform). This compound is represented by the structural formula

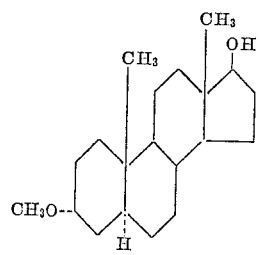

EXAMPLE 3

To 40 parts by volume of 3 molar ethereal methyl magnesium bromide is added dropwise with stirring a solution of 2 parts of 3α-methoxy-5α-androstan-17-one in 42 parts of ether over a period of about 30 minutes. The resulting reaction mixture is heated at reflux for about 6 hours, then is stored at room temperature for about 16 hours. It is poured slowly into a mixture of ice and water containing ammonium chloride, and the ether layer is separated. The aqueous layer is then extracted with ether, and this extract is combined with the original ether layer. The total organic solution is washed successively with dilute aqueous hydrochloric acid and dilute aqueous sodium bicarbonate, then is dried over anhydrous potassium carbonate containing decolorizing carbon. Recrystallization from aqueous methanol affords pure 3α-methoxy-17α-methyl-5α-androstan-17β-ol, M.P. about 141.5–143°; $[\alpha]_D = -14°$ (chloroform). It is further characterized by the structural formula

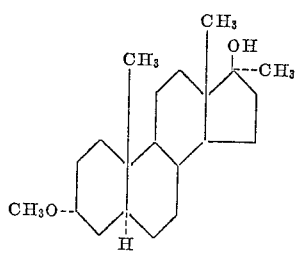

EXAMPLE 4

A mixture of 171 parts of diethylene glycol dimethyl ether and 10 parts of diethylene glycol monoethyl ether is heated to about 130°, and 36 parts of potassium hydroxide is added with stirring. The resulting mixture is allowed to cool to room temperature with stirring, then is cooled further by means of an ice-alcohol bath to about 0°, at which time a stream of acetylene is passed over the surface of the mixture. A solution of 6.5 parts of 3α-methoxy-5α-androstan-17-one in 47.5 parts of diethylene glycol dimethyl ether is added over a period of about 3 hours, during which time acetylene addition is continued. After completion of the addition of the latter solution, the addition of acetylene and stirring are continued for about one hour longer. Approximately 100 parts of water are then added, and this aqueous mixture is poured slowly into about 1200 parts of a mixture of ice and water containing 65.5 parts of concentrated hydrochloric acid. The resulting precipitate is collected by filtration, washed on the filter with water, and dried in air. The resulting crude product is dissolved in 200 parts by volume of a 1:3 mixture of acetone and ether, and that organic solution is decolorized by treatment with activated carbon. Distillation of the solvent under nitrogen affords a residue, which is recrystallized from aqueous methanol, resulting in pure 17α-ethynyl-3α-methoxy-5α-androstan-17β-ol methanolate, melting at about 62–65° and displaying an optical rotation of −38.5° in chloroform. It is further characterized by the structural formula

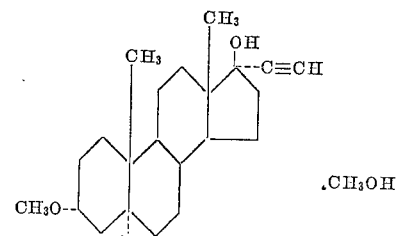

EXAMPLE 5

To a solution of 1.5 parts of 17α-ethynyl-3α-methoxy-5α-androstan-17β-ol in 16 parts of ethanol is added 0.15 part of 5% palladium-on-carbon catalyst, and the resulting reaction mixture is shaken in a hydrogen atmosphere at atmospheric pressure and room temperature until 2 molecular equivalents of hydrogen are absorbed. The catalyst is removed by filtration and washed on the filter with ethanol. Concentration of the filtrate to dryness under reduced pressure affords a residue, which is recrystallized from aqueous ethanol to yield pure 17α-ethyl-3α-methoxy-5α-androstan-17β-ol, melting at about 107–108°. It is characterized further by an optical rotation of −11.5° in chloroform and by the following structural formula

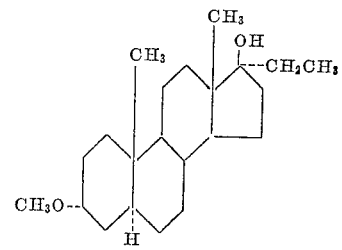

EXAMPLE 6

A solution of 5 parts of 3α-methoxy-17α-methyl-5α-androstan-17β-ol in 70 parts of pyridine and 35 parts of acetic anhydride is heated at reflux for about 7 hours, is allowed to cool, then is stored for about 16 hours at room temperature. Dilution of this reaction mixture with water results in precipitation of the crude product which is collected by filtration, washed with water and dried in air. Recrystallization from aqueous methanol affords platelet-like crystals of pure 3α-methoxy-17α-methyl-5α-androstan-17β-ol 17-acetate, melting at about 125–127°. This substance is represented by the structural formula

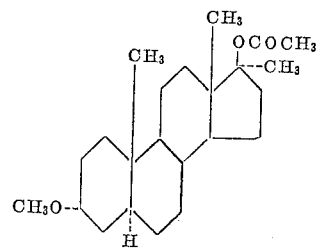

EXAMPLE 7

The substitution of an equivalent quantity of 3α-methoxy-5α-androstan-17β-ol or of 17α-ethyl-3α-methoxy-5α-androstan-17β-ol in the procedure of Example 6 results in 3α-methoxy-5α-androstan-17β-ol 17-acetate and 17α- ethyl-3α-methoxy-5α-androstan-17β-ol 17-acetate, respectively.

EXAMPLE 8

By substituting an equivalent quantity of propionic anhydride and otherwise proceeding according to the processes of Examples 6 and 7, 3α-methoxy-5α-androstan-17β-ol 17-propionate, 3α-methoxy-17α-methyl-5α-androstan-17β-ol 17-propionate, and 17α-ethyl-3α-methoxy-5α-androstan-17β-ol 17-propionate are obtained.

What is claimed is:

1. A compound of the structural formula

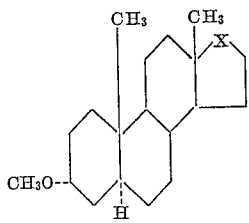

wherein X is selected from the group consisting of carbonyl, β-hydroxymethylene, α-(lower alkyl)-β-hydroxymethylene, β-(lower alkanoyl)oxymethylene, and α-(lower alkyl)-β-(lower alkanoyl)oxymethylene radicals.

2. 3α-methoxy-5α-androstan-17-one.
3. 3α-methoxy-5α-androstan-17β-ol.
4. 3α-methoxy-17α-methyl-5α-androstan-17β-ol 17-acetate.
5. A compound of the structural formula

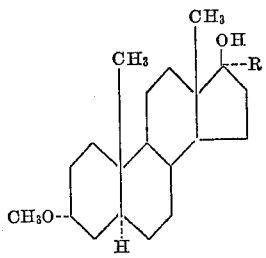

wherein R is a lower alkyl radical.

6. 3α-methoxy-17α-methyl-5α-androstan-17β-ol.
7. 17α-ethyl-3α-methoxy-5α-androstan-17β-ol.
8. 17α-ethynyl-3α-methoxy-5α-androstan-17β-ol.

References Cited in the file of this patent

UNITED STATES PATENTS

| | | |
|---|---|---|
| 2,184,299 | Hildebrandt et al. | Dec. 26, 1939 |
| 2,232,735 | Schoeller et al. | Feb. 25, 1941 |
| 2,267,759 | Serini et al. | Dec. 30, 1941 |
| 2,332,486 | Hildebrandt et al. | Oct. 19, 1943 |

UNITED STATES PATENT OFFICE
CERTIFICATE OF CORRECTION

Patent No. 3,128,292

April 7, 1964

Raymond E. Counsell et al.

It is hereby certified that error appears in the above numbered patent requiring correction and that the said Letters Patent should read as corrected below.

Column 2, line 5, for "3-methoxy-" read -- 3α-methoxy- --.

Signed and sealed this 27th day of October 1964.

(SEAL)
Attest:

ERNEST W. SWIDER
Attesting Officer

EDWARD J. BRENNER
Commissioner of Patents